United States Patent [19]

Hikita et al.

[11] Patent Number: 4,934,202
[45] Date of Patent: Jun. 19, 1990

[54] MOVABLE TABLE

[75] Inventors: Osamu Hikita, Toyonaka; Keiichi Jin, Hirakata, both of Japan

[73] Assignee: Matsushita Electric Industrial Co., Ltd., Kadoma, Japan

[21] Appl. No.: 355,052

[22] Filed: May 19, 1989

Related U.S. Application Data

[63] Continuation-in-part of Ser. No. 251,931, Sep. 30, 1988, abandoned, which is a continuation of Ser. No. 884,891, Jul. 14, 1986, abandoned.

[30] Foreign Application Priority Data

Jul. 15, 1985 [JP] Japan .................. 60-155426

[51] Int. Cl.⁵ .................. F16H 27/02; F16H 1/18
[52] U.S. Cl. .................. 74/89.15; 74/424.8 R; 74/89.2; 269/73
[58] Field of Search .............. 74/89.15, 89.2, 424.8 R; 269/73

[56] References Cited

U.S. PATENT DOCUMENTS

| | | | |
|---|---|---|---|
| 2,951,728 | 9/1960 | Drake | 384/15 |
| 3,337,732 | 8/1967 | Opocensky | 74/89.15 |
| 3,665,782 | 5/1972 | Loftus | 74/424.8 R |
| 4,022,076 | 5/1977 | Metz | 74/89.15 |
| 4,372,223 | 2/1983 | Iwatani | 74/89.15 |
| 4,577,845 | 3/1986 | Kimura et al. | 74/424.8 R |
| 4,598,957 | 7/1986 | Shibayama | 384/51 |
| 4,763,886 | 8/1988 | Takei | 269/73 |

FOREIGN PATENT DOCUMENTS

| | | |
|---|---|---|
| 2201492 | 7/1973 | Fed. Rep. of Germany ....... 74/89.2 |
| 2800313 | 7/1979 | Fed. Rep. of Germany . |
| 0128871 | 12/1984 | Fed. Rep. of Germany . |
| 653295 | 3/1929 | France . |
| 2261843 | 2/1975 | France . |
| 5695555 | 12/1979 | Japan . |
| 56-163819 | 3/1982 | Japan . |
| 752078 | 7/1980 | U.S.S.R. ......... 74/424.8 R |

*Primary Examiner*—Dirk Wright
*Attorney, Agent, or Firm*—Cushman, Darby & Cushman

[57] ABSTRACT

A movable table is provided with a guide rail, a movable block capable to move along with the guide rail, a driving means, and a power transmitting means transmitting from the driving means to the movable block; the movable block has a hole to contain the power transmitting means therein, and a bearing is formed between the guide rail and the movable block, and therefore, when a pre-load is applied on the movable block, the parts thereof on which the bearing is formed do not bend in any direction, and proper pre-loaded state is constantly kept.

3 Claims, 3 Drawing Sheets

MOVABLE TABLE

This is a continuation-in-part of application Ser. No. 251,931 filed Sept. 30, 1988 which was abandoned upon the filing hereof and which was a continuation of U.S. Ser. No. 884,891 filed July 14, 1986 now abandoned.

FIELD OF THE INVENTION AND RELATED ART STATEMENT

1. Field of the Invention

The present invention relates to a movable table, and particularly pertains to a movable table widely used for general industrial equipments such as a machine tool.

2. Description of the Related Art

Recently, a movable table is used for various industrial equipments such as a machine tool and an industrial robot, and demand therefor has rapidly increased. In the following, a related art to the movable table is described with reference to the drawings.

A conventional movable table has a construction as shown in FIG. 5 and FIG. 6 of Japanese Patent Gazette of unexamined patent application No. Sho. 59-137616.

In FIG. 5 and FIG. 6, a movable block 41 has a pair of ball or roller (hereinafter merely refer to as ball) traveling grooves 42, 42 on inner side of both vertical protrusions and a pair of ball circulation passages 43 bored in both vertical protrusions. A driving system 44 comprises a motor 45 for giving driving force to the movable block 41 through a ball thread 48 comprising a screw bolt 46a, nut part 46b, and a screw bolt bearing 46c. A fixed base 47 containing the screw bolt 46a of ball thread 46 has a pair ball traveling grooves 48, 48 which form a pair of ball traveling passages 42a in together with the ball traveling grooves 42, 42 provided on the movable block 41. And balls 49 inserted in each other facing ball traveling passages 42a, 42a operate as balls for a ball-and-roller bearing used for a rectilinear motion. In the movable table having the above-mentioned constitution, the movable block 41 is given a rectilinear motion by translating a rotary motion of the motor 45 into a rectilinear motion by use of the ball thread 46.

However, in the above-mentioned conventional movable table, the fixed base 47 has a U-shape in cross section to accommodate the ball thread 46 therein. The movable block, therefore, 41 also has U-shape in cross-section so that ball traveling grooves 42 can be defined between base 47 and block 41. Because both the fixed base 47 and the movable block 41 have U-shaped cross-sections, the rigidity of block 41 against external forces in the direction of X indicated by arrow is inferior to rigidities against the external force from the other directions, and deflection of the depending arms is likely.

More particularly, because both base 47 and block 41 of this prior art structure are U-shaped in cross-section, when the block 41 is loaded and exposed to forces from various direction, because fo the lack of structural rigidity, as discussed above, the downwardly depending legs will tend to deflect outwardly. Therefore a spacing between ball traveling grooves 42, 48 and balls 49 is produced and smooth sliding action of the movable block 41 is not possible. Thus, it is difficult to make it in a proper pre-loaded state.

OBJECT AND SUMMARY OF THE INVENTION

The present invention aims at solving the above-mentioned problems pointed out with respect to the prior art, and has for its object to provide an improved movable table having a strength capable of accepting a pre-load between ball or roller of a ball-and-roller bearing and traveling groove thereof, and to prevent a generation of spacing between the ball or roller and the traveling groove thereof, even when external force is applied on a movable block.

A movable table of the present invention comprises:
a guide rail extending in one horizontal direction,
a movable block being movable along with the guide rail, and being provided with a hole in a moving direction thereof, by means of a linear bearing formed in cooperation with the guide rail,
driving means, and
power transmitting means for transmitting a force from driving means to the movable block, at least a part of the power transmitting means being disposed in the hole.

In the movable table of the present invention, the ball thread is inserted in the hole of the movable block, the movable block has a hollow rectangle shape in cross section, but has a bottom part connecting both side parts. And therefore, when a pre-load is applied on the ball-and-roller bearing and an external force operates on the movable block, the side parts having ball travelling grooves do not bend in outward direction.

DESCRIPTION OF THE PREFERRED EMBODIMENTS

Figure 1:
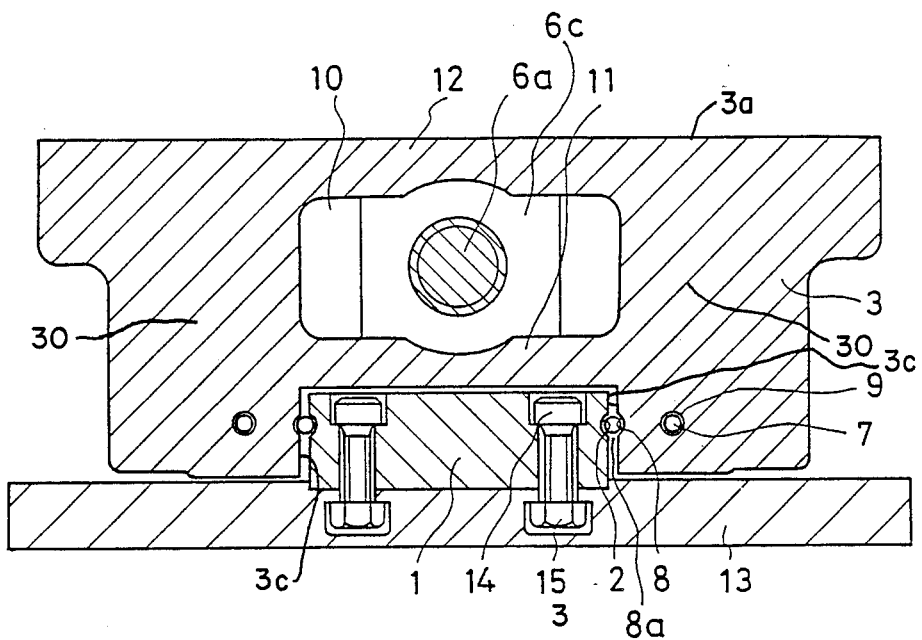
FIG. 1 is a sectional view showing a movable table as an embodiment of the present invention.
Figure 2:
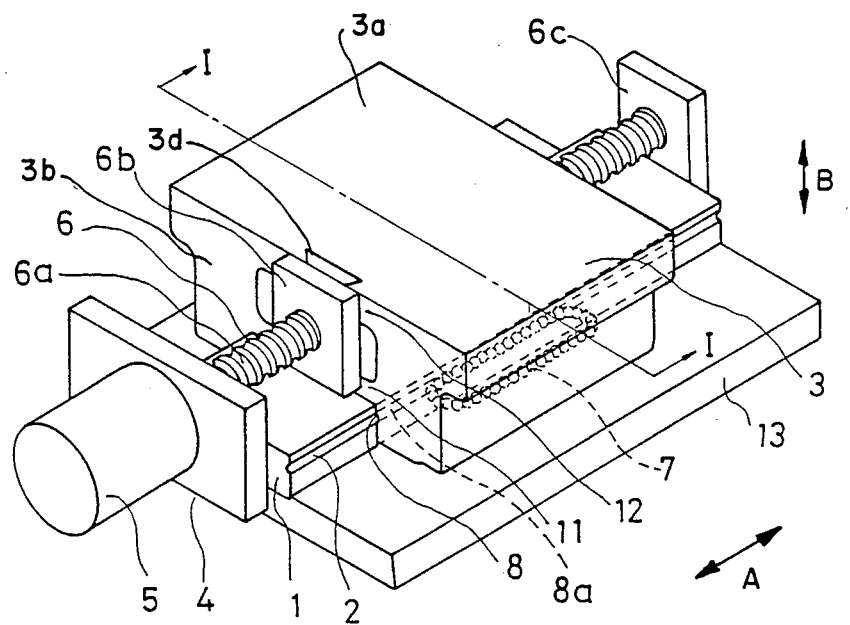
FIG. 2 is a perspective view thereof.

A preferred embodiment of the moving table in accordance with the present invention is described referring to FIGS. 1 and 2.

In FIGS. 1 and 2, a guide rail 1 is fixed to a fixed base 13 with bolts 14 and nuts 15. The guide rail 1 has a pair of straight and parallel ball traveling grooves 2 on its side walls for holding and enabling traveling of balls 7 therein. A moving block 3 slides on and along with the guide rail 1 in the same direction as the ball traveling grooves 2 shown by arrow A. The moving block 3 has a flat top 3a in which tool, work or parts to be assembled are carried. The moving block 3 also has a hole 10 in which a ball thread 6 penetrates. A driving system 4 comprises a motor 5 and the ball thread 6. The ball thread 6 comprises a screw bolt 6a, nut part 6b, and a screw bolt bearing 6c. The nut part 6b is slidably coupled to, for example, guide groove 3d on side wall 3b of the moving block 3. The side wall 3b is vertical to the direction shown by arrow A. The nut part 6b is not movable against the moving block 3 in the direction shown by arrow A. But the nut part 6b is movable against the moving block 3 in a direction shown by arrow B which is vertical to the moving direction of the moving block 3. Namely, the nut part 6b and the moving block 3 are slidably coupled in the direction shown by arrow B. Both side walls 3c, 3c of an inner channel part of the moving block 3 has ball traveling grooves 8. Ball (or roller) traveling passage 8a is formed by cooperation of the ball traveling grooves 8 with the ball traveling grooves 2. Ball circulation passages 9 are continuously formed on the ball traveling grooves 8 in the moving block 3. The ball circulation passages 9 hold and circulate the balls 7. A ball and roller bearing for rectilinear motion is constructed of the guide rail 1, the moving block 3 and the balls 7. The moving block 3 has an upper part 12 and a lower part 11 around the hole 10. And both sides 30, 30 give enough strength to prevent a bending of the moving block.

Operation of the movable table having the above-mentioned construction is described with reference to FIG. 1 and FIG. 2.

Rotational motion of the motor 5 is changed into rectilinear motion by the ball thread 6. The rectilinear motion is transmitted to the movable block 3. The balls 7 are circulated through the ball traveling passage 8a formed by ball traveling grooves 2 and 8, and the ball circulation passage 9. For actual use, a pre-load is applied on the ball-and-roller bearing formed by the guide rail 1, the movable block 3 and balls 7, in order to prevent an undesirable small downward motion of the movable block 3 when a load is applied on the movable table. When the pre-load is applied on the ball-and-roller bearing and the external force operates to the movable block 3, a tensile force is applied on the lower thin part 11 of the movable block 3. On the other hand, to the upper thin part 12 of the movable block 3, a force in horizontal and inward direction is applied. However, although the movable block 3 is provided with the hole 10, the upper and lower thin parts 11 and 12 have enough thickness, hence enough strength, to withstand the above-mentioned forces. Furthermore, since the guide rail 1 does not have hollow parts, it is very strong against the external force from horizontal direction. And therefore, the spacing between the ball traveling grooves 2, 8 and balls 7 is not made.

As mentioned above, according the present invention, it is possible to apply the pre-load between the ball travelling grooves 2, 8 and balls 7, and to keep a proper pre-loaded state, even when the external force is applied on the movable block 3. Because the guide rail 1 with two grooves 2 and the movable block 3 are combined, and because the lower part 11 and the upper parts 12 of the movable block 3 gives enough strength to withstand the load without bending to the movable block 3.

Figure 3:
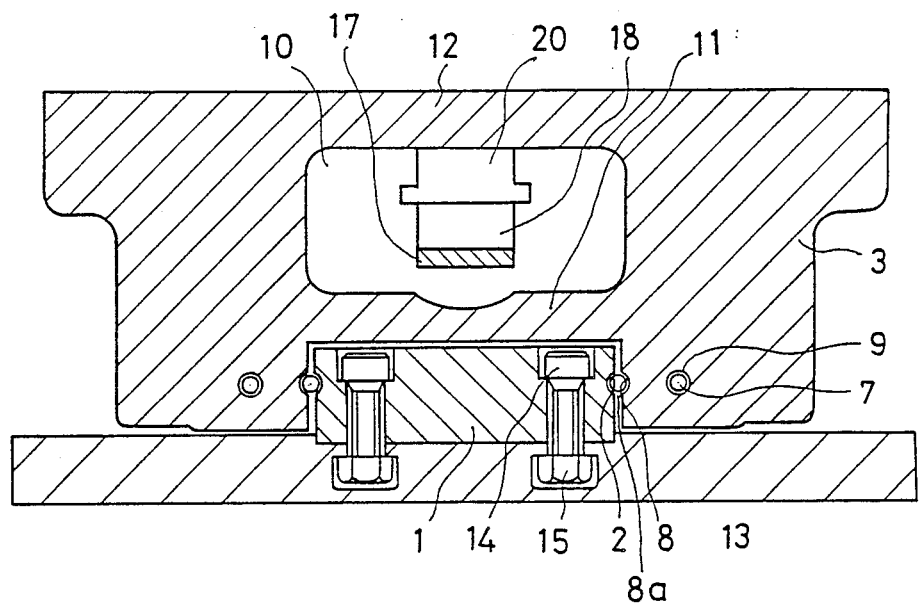
FIG. 3 is a sectional view showing a movable table as another embodiment of the present invention.
Figure 4:
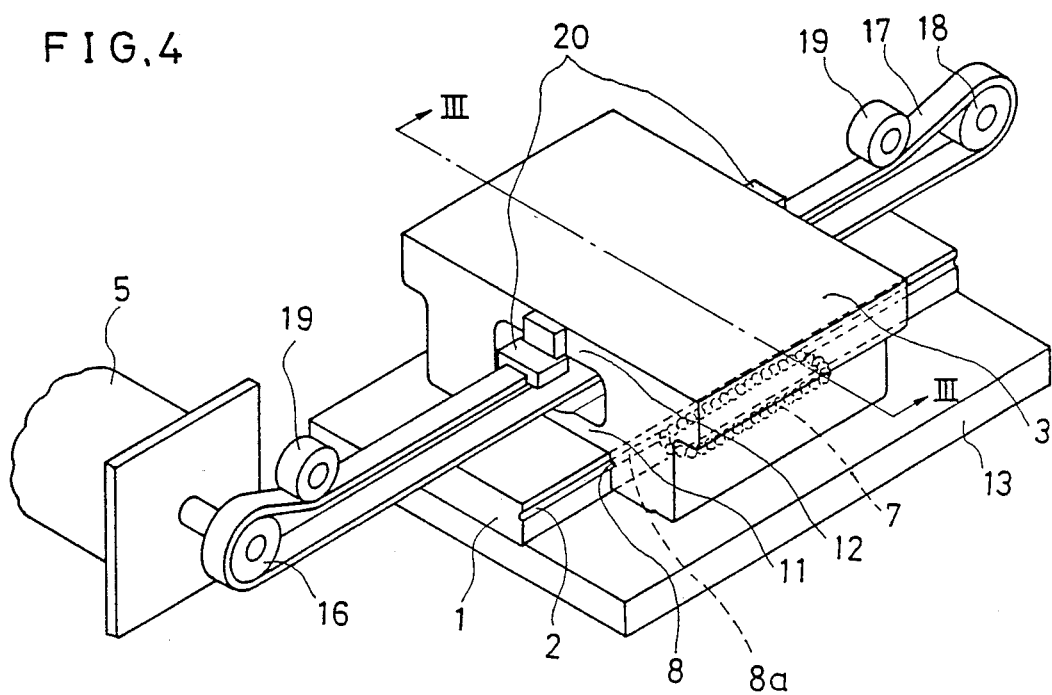
FIG. 4 is a perspective view thereof.
Figure 5:
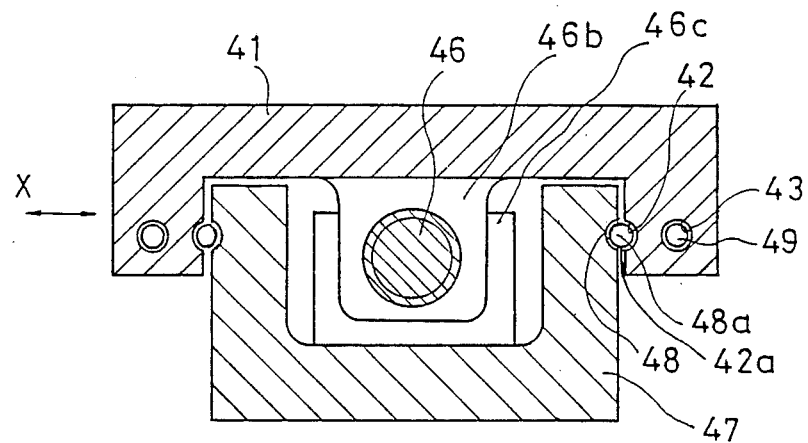
FIG. 5 is a sectional view showing a conventional movable table.
Figure 6:
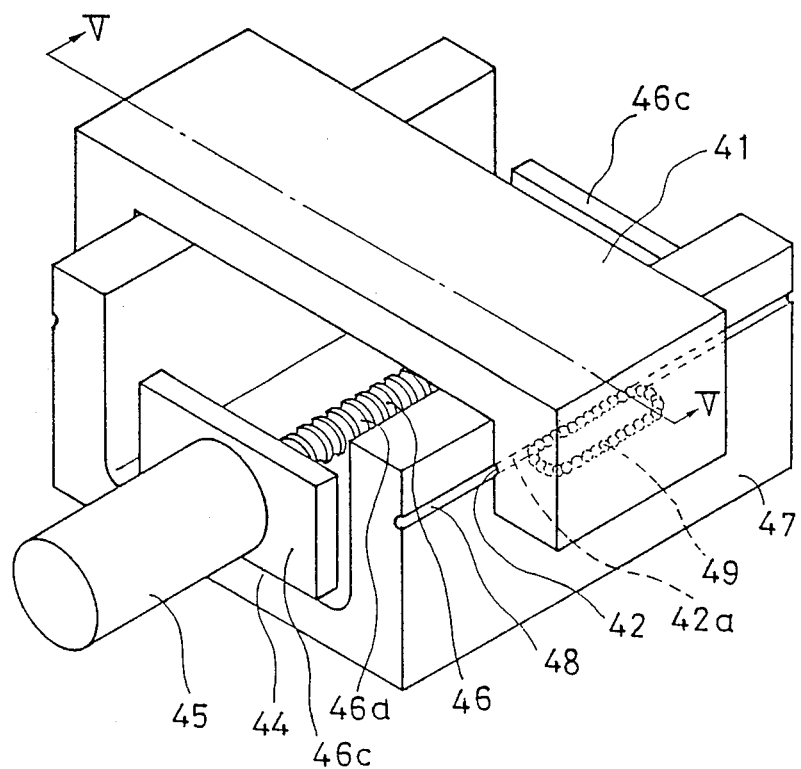
FIG. 6 is a perspective view thereof.

Next, FIG. 3 shows a movable table as another embodiment of the present invention, and FIG. 4 is a perspective view thereof. The movable table of this embodiment is different from the first embodiment shown in FIG. 1 and FIG. 2 in that a driving means comprises a motor 5, a driving pulley (gear) 16, a timing belt 17, a subordinate pulley 18, and idle pulleys 19, and a timing belt fixing part 20 for fixing the timing belt 17 to the movable block 3. And other parts are almost the same as the first embodiment.

In the movable table having the above-mentioned construction, a rotary motion is changed into a rectilinear motion by the driving pulley 16 and the timing belt 17. The rectilinear motion is transmitted to the movable block 3 through the timing belt fixing part 20 connecting the timing belt to the movable block 3. The timing belt 17 can performs a reciprocating motion along with hole 10.

As mentioned above, by using the driving means comprising the moro 5, the driving pulley 16 and the timing pulley 17, it is possible to obtain the same effects as that of the first embodiment.

In the above-mentioned embodiments, the balls 7 can be replaced by rollers.

What is claimed is:

1. A moving table comprising:
a fixed base;
a guide rail extending in a first horizontal direction and fixedly mounted to said fixed base;
a moving block mounted for sliding movement along said guide rail and having a flat top and an aperture defined therethrough, said aperture having a longitudinal axis substantially parallel to a moving direction of said moving block;
means defining a linear bearing intermediate said moving block and said guide rail, said moving block being mounted astride said guide rail such that said aperture is defined vertically above said guide rail and said linear bearing means;
driving means for driving said moving block relative to said guide rail; and
power transmitting means for transmitting a force from said driving means to said moving block, said transmitting means having a screwbolt penetrating said aperture and a nut part coupled to said moving block slidably in a vertical plane against said moving direction of said moving block.

2. A moving table comprising:
a fixed base;
a guide rail having at least a pair of straight and parallel grooves for holding and transferring balls, said guide rail being fixedly mounted to said fixed base;
a moving block mounted astride said guide rail for sliding movement along said guide rail and having a flat top and an aperture defined therethrough, said aperture having a longitudinal axis substantially parallel to a moving direction of said moving block, said moving block having a pair of grooves for holding and transferring balls in cooperation with said grooves of said guide rail, said grooves being in facing relation to said grooves of said guide rail, said moving block being mounted to said guide rail such that grooves are disposed at a level vertically below a bottom wall of said aperture;
driving means for driving said moving block relative to said guide rail; and
power transmitting means for transmitting a force from said driving means to said moving block, said transmitting means having a screwbolt penetrating said aperture and a nut part coupled to said moving block slidably in a vertical plane against said moving direction of said moving block.

3. A moving table comprising:
a fixed base;
a guide rail having at least a pair of straight and parallel grooves for holding and transferring rollers, said guide rail being fixedly mounted to said fixed base;
a moving block mounted astride said guide rail for sliding movement along said guide rail for sliding movement along said guide rail and having a flat top and an aperture defined therethrough, said aperture having a longitudinal axis substantially parallel to the moving direction of said moving block, said moving block having a pair of grooves for holding and transferring rollers in cooperation with said grooves of said guide rail, said grooves being in facing relation to said grooves of said guide rail, said moving block being mounted to said guide rail such that said grooves are disposed at a level vertically below a bottom wall of said aperture;
driving means for driving said moving block relative to said guide; and
power transmitting means for transmitting a force from said driving means to said moving block, said transmitting means having a screwbolt penetrating said aperture and a nut part coupled to said moving block slidably in a vertical plane against said moving direction of said movable block.

* * * * *